(12) United States Patent
Geissler et al.

(10) Patent No.: US 6,270,692 B1
(45) Date of Patent: Aug. 7, 2001

(54) DISPERSION POWDERS WITH INCREASED AUTOIGNITION TEMPERATURE

(75) Inventors: Ulrich Geissler, Hochheim; Helmut Rinno, Wiesbaden, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 08/672,259

(22) Filed: Jun. 26, 1996

(30) Foreign Application Priority Data

Jun. 26, 1995 (DE) ................................................ 195 23 115

(51) Int. Cl.$^7$ ............................... B01F 3/12; C08K 5/134; C08K 5/37; C08K 5/49

(52) U.S. Cl. ................................... 252/363.5; 252/400.1; 252/402; 252/403; 252/404; 252/406; 252/407; 523/333; 523/340; 523/351; 524/291; 524/299; 524/904; 525/934; 526/330

(58) Field of Search ............................ 252/363.5, 400.1, 252/402, 403, 404, 406, 407; 523/333, 351, 340; 524/291, 299, 904; 525/934; 526/330

(56) References Cited

U.S. PATENT DOCUMENTS

| | | | |
|---|---|---|---|
| 3,326,848 | * 6/1967 | Clemens et al. | 524/904 X |
| 3,988,493 | * 10/1976 | Yallourakis | 525/934 X |
| 4,011,188 | 3/1977 | Rüter et al. | 524/222 |
| 4,169,078 | 9/1979 | Spicuzza, Jr. et al. | 536/117 |
| 4,704,416 | 11/1987 | Eck et al. | 524/17 |
| 5,015,676 | 5/1991 | Macholdt et al. | 523/453 |
| 5,034,432 | * 7/1991 | Ueno et al. | 525/934 X |
| 5,059,347 | 10/1991 | Mollet et al. | 252/400.62 |
| 5,098,955 | * 3/1992 | Pettit, Jr. | 525/934 X |
| 5,116,534 | 5/1992 | Mollet et al. | 252/308 |
| 5,196,142 | 3/1993 | Mollet et al. | 252/311 |
| 5,212,245 | 5/1993 | Franks et al. | 525/223 |
| 5,225,478 | * 7/1993 | Beckerle et al. | 524/510 |
| 5,364,895 | * 11/1994 | Stevenson et al. | 524/120 |
| 5,424,341 | * 6/1995 | Ogoe et al. | 523/436 |
| 5,455,289 | * 10/1995 | Caselli | 523/340 X |
| 5,567,750 | * 10/1996 | Schulze et al. | 524/3 |

FOREIGN PATENT DOCUMENTS

| | | |
|---|---|---|
| 2 156 422 | 5/1973 | (DE) . |
| 9301866 | 4/1993 | (DE) . |
| 228657 | 7/1987 | (EP) . |
| 315084 | 5/1989 | (EP) . |
| 499435 | 8/1992 | (EP) . |
| 2292022 | 6/1976 | (FR) . |
| 2413458 | 7/1979 | (FR) . |
| 1 134 337 | 11/1968 | (GB) . |

* cited by examiner

Primary Examiner—Richard D. Lovering
(74) Attorney, Agent, or Firm—Heller Ehrman White & McAuliffe LLP

(57) ABSTRACT

Dispersion powders with a reduced tendency to autoignition are obtained by adding antioxidants to dispersions before spray drying or to dispersion powders after spray drying.

18 Claims, No Drawings

DISPERSION POWDERS WITH INCREASED AUTOIGNITION TEMPERATURE

BACKGROUND OF THE INVENTION

Aqueous polymer dispersions prepared by emulsion polymerization are employed in a very large number of areas, for example as binders for paints and inks, adhesives and paper-coating compositions, and in construction.

In recent years, increasing quantities of these aqueous dispersions have not been used directly, but instead, by evaporating the aqueous phase, preferably by spray drying, the polymers have first been obtained as so-called dispersion powders. Such dispersion powders are generally prepared from polymers based on vinyl monomers, such as vinyl acetate, copolymers of vinyl acetate with ethylene, other vinyl esters of aliphatic monocarboxylic acids, preferably esters of versatic acid, terpolymers of vinyl acetate, ethylene, and acrylic monomers such as alkyl acrylates and methacrylates where the alkyl residue has from 1 to 22 carbon atoms, and may be linear, branched, or cyclic, preferably methyl methacrylate, butyl acrylate, 2-ethyl hexyl acrylate, and the like, copolymers of acrylates and methacrylates of the above type, as well as terpolymers of acrylates, methylcrylates and styrene or its derivatives. Given an appropriate procedure, and using appropriate emulsifiers and protective colloids, dispersion powders which after spray drying have particle sizes of from 10 to 250 µm diameter are readily re-emulsifiable after stirring with water, largely breaking down into the original particles having approximately the particle size of the initial dispersions, for example from 0.1 to 5 µm.

Useful protective colloids include polyvinyl alcohol; cellulose derivatives such as hydroxyethyl cellulose, methyl cellulose, and carboxy methyl cellulose; (co)polymers of ethylenically unsaturated carboxylic acids such as polyacrylic acid; and polyvinyl pyrrolidone.

The dispersion powders usually contain minor amounts, e.g., mass fractions of 0.1 to 2, based on the total mass of the powder composition, of anticaking agents, such as quartz powder, disperse silica, silicates such as talc, mica, micaschist, aluminium silicates, etc., and carbonates such as dolomite, lime, and mixtures of these.

Dispersion powders are customarily made by spray drying of dispersions of synthetic polymers in usual spray drying equipment. Pulverisation or atomisation, as it is also termed, is usually effected by means of a rotating disc or of multi-component nozzles. Details are described, i.a., in K. Masters, "Spray drying Handbook", Longman Scientific & Technical, 1991.

The particular advantage of the dispersion powders is the possibility of employing them with hydraulically setting binders, such as cement and gypsum, in standardized, ready-prepared dry mixtures with very good storage properties and of being able to bring them into the ready-to-use form not until directly before use, by addition of water. These ready-prepared mixtures, like the dispersion powders themselves, are insensitive to frost and therefore require relatively little constructional expenditure with regard to storage in comparison to aqueous or pastelike products.

Principal applications of such powders are hydraulically splitting compositions, for example, wall fillers, concrete patching mortars, floor leveling compounds, plastics-modified plasters, nonshrink grouting compounds, cement-based jointing mortars, building adhesives in powder form, for example tile adhesives, composite heat insulation systems, and cement-free coatings, for example paints, plasters, joint fillers, wall fillers and floor-filling compositions. Further applications are wallpaper pastes, compositions containing gypsum and anhydrite, ceramic compositions, and adhesives.

Such applications are comprehensively described in J. Schulze, TIZ Fachberichte, Vol. 109 (1985), No. 9, pages 698 et seq.; X.Ci, R. R. Falconio, Cement, Concrete, and Aggregates, Vol. 17 (1995) No. 2, pages 218 et seq.; and R. P. Bright, Cement, Concrete, and Aggregates, Vol. 17 (1995) No. 2, pages 227 et seq.

The numerous advantageous properties of the dispersion powders are opposed, however, by other properties, which must be taken into account during transportation, storage and handling.

Pulverulent organic substances of high specific surface area may have a tendency at elevated storage temperatures, especially in large silos, to heat up or even to undergo spontaneous ignition. It is therefore important in the case of dispersion powders as well that heating or autoignition at elevated storage temperatures can be reliably ruled out.

One classification criterion for this property is the autoignition temperature. It is measured in a 1000 ml wire mesh cube. The pulverulent substance is placed in the sample container, which is filled up to the edge and stored at 140° C. for 24 hours. It is observed whether the temperature in the sample exceeds 200° C.

This criterion is based on the autoignition temperature of charcoal, which is 50° C. for a cubic sample of 27 $m^3$ and 140° C. for a 1000 ml sample.

In accordance with German Hazardous Goods Regulations, Road (GGVS) (Literature: Test criteria and test methods for the classification of hazardous substances of hazardous goods classes 4.1, 4.2, 4.3 and 5.1, K. O. Storck Verlag, Hamburg) and UN recommendations of the Committee of Experts on the Transport of dangerous Goods, substances are placed in the following classes:

Class 4.1 Flammable solids

Class 4.2 Autoignitable substances

Class 4.3 Substances which in contact with water give off flammable gases

Class 5.1 Substances with an igniting (oxidizing) action

For the simple and safe handling of dispersion powders it is important that the conditions of class 4.1 are attained. It must accordingly be ensured that, on long-term heating at 140° C. in a standardized measurement set-up, no autoignition occurs and the temperature in the core of the sample, after storage at an ambient temperature of 140° C. for 24 hours, has not risen above 200° C.

If these criteria are not met, the substance is placed in hazardous goods classes 4.2, 4.3 or 5.1. This entails a relatively high level of expenditure on technical safety measures in connection with production, transportation, storage and handling.

The addition of antioxidants to polymeric organic compositions has already been proposed. Since polymers, when stored in air at elevated temperature, show a tendency toward oxidative degradation of the polymer chains and thus toward discoloration reactions, loss of mechanical strength and embrittlement, antioxidants have been added to those industrial products which, in the case of thermoplastic processing and/or when used as intended at elevated temperature, are subject to an increased risk of oxidative degradation.

DE-B 12 89 037 describes a method for stabilizing dispersions of compounds which contain oxyalkylene or polyoxyalkylene groups, by addition of bisphenolcarboxylic acid esters.

DE-A 21 56 422 mentions polyvalent esters of bisphenolcarboxylic acids as antioxidants in dispersions. The dispersions described are used, for example, to coat webs of woven material. The service life of the dipping baths is increased markedly by addition of the antioxidants.

U.S. Pat. No. 3,962,123 discloses the preparation of storage-stable dispersions comprising phenolic antioxidants. In addition to the phenolic antioxidants such dispersions comprise fatty acid soaps or nonionic or anionic surface-active substances and water.

U.S. Pat. Nos. 5,059,347 and 5,196,142 likewise relate to storage-stable emulsions of phenolic antioxidants which comprise a fatty acid salt and a fatty alcohol.

EP-A 0 439 427 describes emulsions containing a phenolic antioxidant, a thiodipropionic ester antioxidant and/or an organic phosphite antioxidant. The emulsions according to the invention are used to stabilize emulsion-polymerized polymers and copolymers.

SUMMARY OF THE INVENTION

The object of the present invention was to provide dispersion powders which have a markedly reduced tendency toward autoignition. It is also an object of the invention to provide methods of making and using such dispersion powders.

In accordance with these objects, there is provided in accordance with a first aspect of the invention, dispersion powders comprising a base polymer and antioxidant.

In accordance with a second aspect of the invention, there is provided a process for the preparation of such dispersions, comprising adding the antioxidant to the dispersion powder comprising a base polymer.

Further objects, features, and advantages of the present invention will become apparent from the detailed description of preferred embodiments that follows.

DETAILED DESCRIPTION OF THE PREFERRED EMBODIMENTS

The present invention provides a dispersion powder of increased autoignition temperature which comprises a base polymer, and at least one antioxidant. Any antioxidants or mixtures thereof can be used. The antioxidants are used in amounts effective to increase the autoignition temperature of the powder.

As antioxidants it is preferably useful to employ the following classes of substances:

1. Phenols, for example:

4-methoxyphenol or hydroquinone, especially sterically hindered phenols of the formula

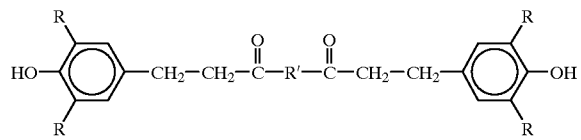

wherein:

each R is independently an alkyl group, preferably a tertbutyl group;

each R' is independently —(O—CH$_2$—CH$_2$)$_3$—O—, —O—(CH$_2$)$_6$—O—, —O—CH$_2$—CH$_2$—S—CH$_2$—CH$_2$—O, —NH—(CH$_2$)$_6$—NH—, —NH—NH—, or

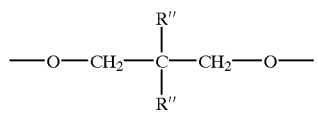

wherein each R" is independently

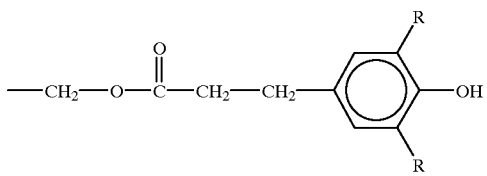

Examples of useful phenols include triethylene glycol bis-3-(3-tert-butyl-4-hydroxy-5-methylphenyl)propionate, 1,6-hexanediol bis-3-(3,5-di-tert-butyl-4-hydroxyphenyl) propionate, 2,2'-thiodiethyl bis[3-(3,5-di-tert-butyl-4-hydroxyphenyl)propionate], N,N'-hexamethylenebis(3,5-di-tert-butyl-4-hydroxyphenyl)proprionamide),N,N'-bis[3-[3,5-di-tert-butyl-4-hydroxyphenyl)propionyl]hydrazide, pentaerythrityl tetrakis[3-(3,5-di-tert-butyl-4-hydroxyphenyl)propionate], as well as the following sterically hindered phenols:

4-[[4,6-bis(octylthio)-1,3,5-triazin-2-yl]amino]-2,6-bis(1,1-dimethylethyl)phenol, octadecyl 3,5-bis(1,1-dimethylethyl)-4-hydroxybenzenepropanoate, 2,2'-thio-bis (4-methyl-6-tert-butylphenol), diethyl 3,5-di-tert-butyl-4-hydroxybenzylphosphonate, 1,3,5-trimethyl-2,4,6-tris(3,5-di-tert-butyl-4-hydroxybenzyl)benzene, the calcium salt (2:1) of monoethyl [[(3,5-bis(1,1-dimethylethyl)-4-hydroxyphenyl]methyl]phosphonate, 2-methyl-4,6-bis [(octylthio)methyl]phenol, 2-(1,1-dimethylethyl)-6-[3-(1,1-dimethylethyl)-2-hydroxy-5-methylphenyl]methyl-4-methylphenyl acrylate, tris(3,5-di-tert-butyl-4-hydroxybenzyl) isocyanurate, bis[3,3-bis(4'-hydroxy-3'-tert-butylphenyl)butanoic acid], bis[3,3-bis(4'-hydroxy-3'-tert-butylphenyl)butanoic acid] glycol ester, 3-(4'-hydroxy-3',5'-di-tert-butylphenyl)propanoic acid, 2,2'-methylenebis(4-methyl-6-tert-butylphenol), 4,4'-butylidenebis(6-tert-butyl-3-methylphenol), 4,4'-thiobis(2-tert-butyl-5-methylphenol) and 2,6-di-tert-butyl-4-methylphenol.

The phenolic antioxidants can be combined with organosulfur compounds, for example dilauryl thiodipropionate, distearyl thiodipropionate, dioctadecyl disulfide or n-dodecanethiol.

2. Phosphorus Compounds, for Example:

Phenyl didecyl phosphite, decyl diphenyl phosphite, tris (nonylphenyl) phosphite, triphenyl phosphite, tris(2,4-di-tert-butylphenyl) phosphite. Preference is given to tris[2-tert-butyl-4-thio(2'-methyl-4'-hydroxy-5'-tert-butyl)phenyl-5-methylphenyl] phosphite.

3. Sterically Hindered Amines, for Example:

A polymer of succinic acid and 4-hydroxy-2,2,6,6-tetramethyl-1-piperidineethanol, N,N'''-[1,2-ethanediyl-bis [[[(4,6-bis[butyl-(1,2,2,6,6-pentamethyl-4-piperidinyl) amino]-1,3,5-triazin-2-yl]-imino]-3,1-propanediyl]]bis[N', N''-dibutyl-N',N''-bis-(1,2,2,6,6-pentamethyl-4-piperidinyl)]-1,3,5-triazine-2,4,6-triamine, poly-[[6[( 1,1,3,3-tetramethylbutyl)amino]-1,3,5-triazine-2,4-diyl]-[2,2,6,6-tetramethyl-4-piperidinyl)imino]-1,6-hexanediyl[(2,2,6,6-tetramethyl-4-piperidinyl)imino)].

4. Other Classes of Compounds:

Other stabilizers which can be used include phenothiazine and alkane- or arenethiols, for example n-dodecanethiol or 2-methyl-5-tert-butylthiophenol.

The antioxidants can be used either individually or in combination.

Particularly preferred antioxidants include sterically hindered phenols, hydroquinone, and phenothiazine.

The invention also provides a process for the preparation of dispersion powders of increased autoignition temperature by addition of antioxidants to dispersion powders or by addition of antioxidants to dispersions and subsequent spray drying.

The antioxidant or the mixture of antioxidant can be added to the dispersion either in powder form, dissolved in an organic solvent or dispersed in an emulsifier solution or protective-colloid solution, for example polyvinyl alcohol. Useful organic solvents for this purpose are those which do not interact with the base polymer and which have a boiling temperature of less than 100° C. Such solvents include aliphatic alcohols such as methanol, ethanol, isopropanol, 2-butanol, tert-butanol, and ketones such as acetone, and methyl ethyl ketone.

A certain degree of water-solubility of the antioxidants can be advantageous, since in this case the antioxidant is accumulated on the surface of the particles under the conditions of spray drying.

The antioxidant can be added to the dispersion powder in any desired manner. Generally, in the case of addition of an antioxidant to a dispersion powder, the mixture generally is homogenized on a roller bed for several hours.

The addition quantities required depend on the antioxidant employed and on the nature of the dispersion powder. They are in general between 0.05 and 2% by weight, in particular between 0.1 and 1% by weight, based on the total weight of the base polymer of the dispersion powder.

As base polymers of the powder it is possible to use any desired polymers, in particular to employ vinyl ester polymers, (meth)acrylate and styrene (meth)acrylate polymers, although other monomer combinations are also useful. The powders can be made in any desired manner.

Suitable vinyl ester polymers include vinyl acetate homopolymers or copolymers of vinyl acetate with ethylene and/or other vinyl esters, such as vinyl propionate, vinyl pivalate, vinyl esters of VERSATIC® acid 9, 10 or 11 (Shell-Chemie, α,α-dialkyl-branched carboxylic acids), vinyl 2-ethylhexanoate and/or esters of acrylic and/or methacrylic acid with straight-chain, branched or cyclic alcohols preferably having 1 to 22 carbon atoms.

The (meth)acrylate and styrene (meth)acrylate polymers are derived from monomers of styrene and/or esters of acrylic acid and/or methacrylic acid with straight-chain, branched or cyclic aliphatic alcohols, generally having 1 to 22 carbon atoms.

The dispersion powders according to the invention comprising at least one antioxidant preferably have an autoignition temperature which is above 150° C., in particular above 165° C., measured in a 400 ccm steel wire mesh cylinder filled completely with the dispersion powder.

The examples which follow are intended to illustrate the invention in more detail, but do not limit the invention. The parts and percentages in the examples are by weight unless stated otherwise.

EXAMPLE 1

A dispersion which is stabilized with polyvinyl alcohol as protective colloid and is based on vinyl acetate, VERSATIC acid 10 vinyl ester and butyl acrylate (45:45:10) is spray-dried with the addition of an anticaking combination of talc and dolomite. The content of anticaking agent is 14%.

The isolated dispersion powder is mixed with various quantities of bis[3,3-bis(4'-hydroxy-3'-tert-butyl-phenyl) butanoic acid] glycol ester (HOSTANOX® 03, Hoechst) on a roller bed (from Broβ) for 24 hours.

The autoignition temperatures of the original powder and of the samples to which antioxidant has been added are determined in accordance with the abovementioned Test methods for the classification of hazardous substances. The experimental procedure is described below:

Equipment:

Drying oven ED 53 (Binder),

Two-channel plotter Servogor (BBC/Goerz),

Iron/constantan thermocouples,

Sample containers (400 ccm cylinders, diameter 8 cm, height 8 cm) made from stainless steel wire mesh (166 mesh, wire thickness 63 $\mu$m), and Protective basket (slightly larger than the sample container) made from stainless steel wire mesh (28 mesh, wire thickness 300 $\mu$m) (both from Spörl).

Procedure:

The sample container is placed in the protective basket. The dispersion powder is placed in the sample container, which is filled up to the edge. The container is tapped lightly several times. When the sample has settled, the container is again filled up to the edge. The protruding material is scraped off to the height of the edge.

The temperature of the drying oven is adjusted to 150° C. and is maintained for 24 hours.

The wire mesh cylinder filled with dispersion powder is placed on a grid in the drying oven.

One of the thermocouples is arranged in the center of the sample and the other is arranged between sample container and oven wall.

The temperatures are measured continuously, with the maximum temperature in the sample being used for the evaluation.

| Quantity of Hostanox 03 add [% based on the base polymers in the powder] | Maximum temperature in the sample ($T_{max}$) [° C.] |
|---|---|
| 0 | 265 |
| 0.1 | 254 |
| 0.15 | 192 |
| 0.2 | 159 |
| 0.25 | 152 |

The results show a decrease in the maximum sample temperature as the quantity of antioxidant increases. Above an added quantity of 0.15% based on powder, the sample temperature no longer rises above 200° C.

EXAMPLE 2

0.25% of each of the following antioxidants based on the base polymers was added to the dispersion powder described in Example 1, and the temperature increase in the case of hot storage (150° C., 24 hours) is determined:

| Antioxidant added | Maximum temperature in the sample ($T_{max}$) [° C.] |
|---|---|
| None (control) | 265 |
| Hostanox OSP1 (a) | 150 |
| Hostanox 03 acid (b) | 150 |

| Antioxidant added | Maximum temperature in the sample ($T_{max}$) [° C.] |
|---|---|
| IRGAPHOS ® 168 (c) | 232 |
| CHIMASSORB ® 944 FL (d) | 178 |
| Phenothiazine | 150 |
| 2,6-Di-tert-butyl-4-methylphenol | 150 |

(a) Tris[2-tert-butyl-4-thio(2'-methyl-4'-hydroxy-5'-tert-butyl)phenyl-5-methylphenyl] phosphite (Hoechst)
(b) Bis[3,3-bis(4'-hydroxy-3'-tert-butyl-phenyl)butanoic acid](Hoechst)
(c) Tris(2,4-di-tert-butylphenyl) phosphite (Ciba-Geigy)
(d) Poly[[6-[(1,1,3,3-tetramethylbutyl)amino]-1,3,5-triazin-2,4-diyl][2,2,6,6-tetramethyl-4-piperidinyl)imino]-1,6-hexanediyl [(2,2,6,6-tetramethyl-4-piperidinyl)imino]] (Ciba-Geigy).

EXAMPLE 3

1500 parts of the dispersion indicated in Example 1 with a solids content of 41% are admixed with a solution of 1.54 parts of HOSTANOX O3 in 15 parts of ethanol (0.25% based on base polymers) and the mixture is then spray-dried with the addition of the anticaking agent combination from Example 1.

After hot storage at 150° C. for 24 hours the temperature in the powder shows virtually no rise ($T_{max}$=152° C.).

EXAMPLE 4

1413 parts of the dispersion indicated in Example 1 with a solids content of 42.6% are admixed with a mixture whose preparation is described below:

13.4 parts of a polyvinyl alcohol (MOWIOL® 4-88 (Hoechst), viscosity of a 4% strength aqueous solution: 4 mpa·s, degree of hydrolysis: 88 mol-%, ester number: 140 mg KOH/g, residual acetyl content: 11%) are scattered with stirring into 72 parts of cold water. While stirring is continued, the suspension is heated to 80–90° C. After the polyvinyl alcohol is dissolved, 1.2 parts of HOSTANOX O3 are scattered in slowly and stirring is continued for about 30 minutes more. The mixture is then cooled.

The dispersion prepared is spray-dried as described above.

The dispersion powder prepared in this way also shows no notable temperature increase on hot storage ($T_{max}$=151° C.).

EXAMPLE 5

1500 parts of the dispersion from Example 1 (solids content 41%) were mixed with 1.54 parts of n-dodecanethiol (0.25% based on base polymers) and the mixture was then spray-dried.

This dispersion powder also shows no increase in temperature on hot storage ($T_{max}$=150° C.).

EXAMPLE 6

A dispersion which is stabilized with polyvinyl alcohol as protective colloid and is based on vinyl acetate and ethylene (76:24) is, with the addition of kaolin as anticaking agent, subjected to spray drying. The content of anticaking agent is 12%.

0.25% of each of the following antioxidants based on base polymers is added to the dispersion powder and the temperature increase on hot storage (150° C., 24 hours) is determined:

| Antioxidant added | Maximum temperature in the sample ($T_{max}$) [° C.] |
|---|---|
| None (control) | 269 |
| HOSTANOX 03 | 200 |
| HOSTANOX 03 acid (b) | 159 |
| IRGANOX ® 245 (e) | 186 |
| IRGANOX ® 1076 (f) | 161 |
| Antioxidant (g) | 152 |
| HOSTANOX OSP1 (a) | 164 |
| CHIMASSORB 944 FL (d) | 226 |
| IRGAPHOS 168 (c) | 214 |
| Hydroquinone | 150 |
| Phenothiazine | 151 |
| 4-Methoxyphenol | 170 |

(e) Triethylene glycol bis(3-(3-tert-butyl-4-hydroxy-5-methylphenyl) propionate
(f) 3,5-Bis(1,1-dimethylethyl)-4-hydroxyoctadecyl benzenepropanoate
(g) 3-(4'hydroxy-3', 5'-di-tert-butylphenyl)propanoic acid

EXAMPLE 7

A dispersion which is stabilized with polyvinyl alcohol as protective colloid and is based on vinyl acetate, VERSATIC acid 10 vinyl ester and 2-ethylhexyl acrylate (53:22:25) is, with the addition of amorphous silica as anticaking agent, subjected to spray drying. The content of anticaking agent is 10%.

On storage of the dispersion powder for 24 hours, a temperature rise to 450° C. is observed.

The dispersion powder to which 0.5% based on base polymers of phenothiazine has been added showed only a temperature rise to 164° C.

EXAMPLE 8

A dispersion powder is employed which is based on vinyl acetate and VERSATIC acid 10 vinyl ester (20:80) and contains amorphous silica as anticaking agent.

After storage for 24 hours, this dispersion powder also shows a temperature rise to 450° C.

Following the addition of 0.5% of phenothiazine based on base polymers, the maximum temperature is 157° C.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A dispersion powder of increased autoignition temperature which is re-emulsifiable in water, said dispersion powder comprising a base polymer and at least one antioxidant in an amount from 0.1 to 1% by weight based of the weight of the dispersion powder, wherein the base polymer comprises a vinyl ester polymer.

2. A dispersion powder as claimed in claim 1, wherein the antioxidant comprises a phosphorus compound.

3. A dispersion powder as claimed in claim 1, wherein the antioxidant comprises a sterically hindered amine.

4. A dispersion powder as claimed in claim 1, wherein the antioxidant comprise phenothiazine.

5. A dispersion powder as claimed in claim 1, wherein the antioxidant comprises an alkanethiol or arenethiol.

6. A process for the preparation of a dispersion powder as claimed in claim 1, which comprises adding the antioxidant to the dispersion powder.

7. A process for the preparation of a dispersion powder as claimed in claim 1, which comprises adding the antioxidant to an aqueous dispersion of the powder to form a mixture, and then spray-drying the mixture to form a powder.

8. A dispersion powder as claimed in claim 1, which has an autoignition temperature of above 150° C.

9. A dispersion powder as claimed in claim 1, which comprises a protective colloid.

10. A dispersion powder as claimed in claim 1, which comprises an anticaking agent.

11. A dispersion powder as claimed in claim 1, wherein the powder has a particle size of from 10 to 250 microns.

12. A dispersion powder as claimed in claim 1 which is produced by spray drying.

13. A dispersion powder as claimed in claim 1, wherein the antioxidant comprises a phenol.

14. A dispersion powder as claimed in claim 13, wherein the phenol comprises hydroquinone.

15. A dispersion powder as claimed in claim 13, which further comprises an organosulfur compound.

16. A dispersion powder as claimed in claim 13, wherein the phenol comprises a sterically hindered phenol of the formula

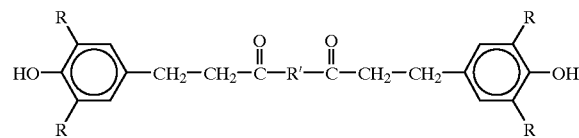

wherein:
each R is independently an alkyl group, each R' is independently —(O—CH$_2$—CH$_2$)$_3$—O—, —O—(CH$_2$)$_6$—O—, —O—CH$_2$—CH$_2$—S—CH$_2$—CH$_2$—O, —NH—(CH$_2$)$_6$—NH—, —NH—NH—, or

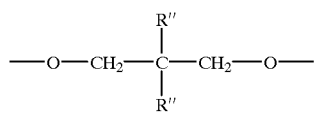

wherein each R" is independently

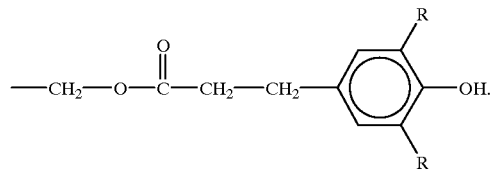

17. A dispersion powder as claimed in claim 16, wherein each R is tert-butyl.

18. A method for increasing the autoignition temperature of a dispersion powder which is re-emulsifiable in water comprising:
combining a base polymer and at least one antioxidant in an amount from 0.1 to 1% by weight based of the weight of the dispersion powder, wherein the base polymer comprises a vinyl ester polymer.

* * * * *